United States Patent [19]

Speicher

[11] Patent Number: 4,867,381

[45] Date of Patent: Sep. 19, 1989

[54] BROADCAST SPREADER FOR PULVERIZED MATERIALS

[76] Inventor: Paul Speicher, P.O. Drawer 210, 810 W. Main St., North Manchester, Ind. 46962

[21] Appl. No.: 242,546

[22] Filed: Sep. 12, 1988

[51] Int. Cl.⁴ ............................................. A01C 17/00
[52] U.S. Cl. .................................... 239/665; 239/390; 239/685; 239/687
[58] Field of Search ............... 239/681, 685, 687, 665, 239/666, 390; 74/488, 523, 543

[56] References Cited

U.S. PATENT DOCUMENTS

| | | | |
|---|---|---|---|
| 3,430,788 | 3/1969 | Edming | 239/665 |
| 3,559,894 | 2/1971 | Murray et al. | 239/687 |
| 3,703,260 | 11/1972 | Grabske | 239/666 |
| 4,106,704 | 8/1978 | McRoskey et al. | 239/685 |
| 4,487,370 | 12/1984 | Speicher | 239/687 |
| 4,511,090 | 4/1985 | Morgan | 239/666 |
| 4,588,133 | 5/1986 | Brabb et al. | 239/665 |
| 4,597,531 | 7/1986 | Kise | 239/685 |

FOREIGN PATENT DOCUMENTS 2175482 12/1986 United Kingdom ............... 239/390

Primary Examiner—Andres Kashnikow
Assistant Examiner—Karen B. Merritt
Attorney, Agent, or Firm—James D. Hall; Thomas J. Dodd; Todd A. Dawson

[57] ABSTRACT

A broadcast spreader which includes a storage hopper and a spinning broadcast plate for distributing materials dropped from the hopper. A valve controls the flow of material to the broadcast plate, and is operated by a dual shaft and linkage. The two shafts are connected by a biasing member which allows a squeezable actuator lever to be fully retracted regardless of the dial setting. The spreader may also include a diffuser positioned between the valve and plate to direct the material towards a preselected area of the broadcast plate. The spreader may also include a readily adjustable means to prevent discharge of material in selected direction. The spreader may also include means for restricting the rate of flow of material from the hopper to the broadcast plate for a selected setting of the valve.

7 Claims, 4 Drawing Sheets

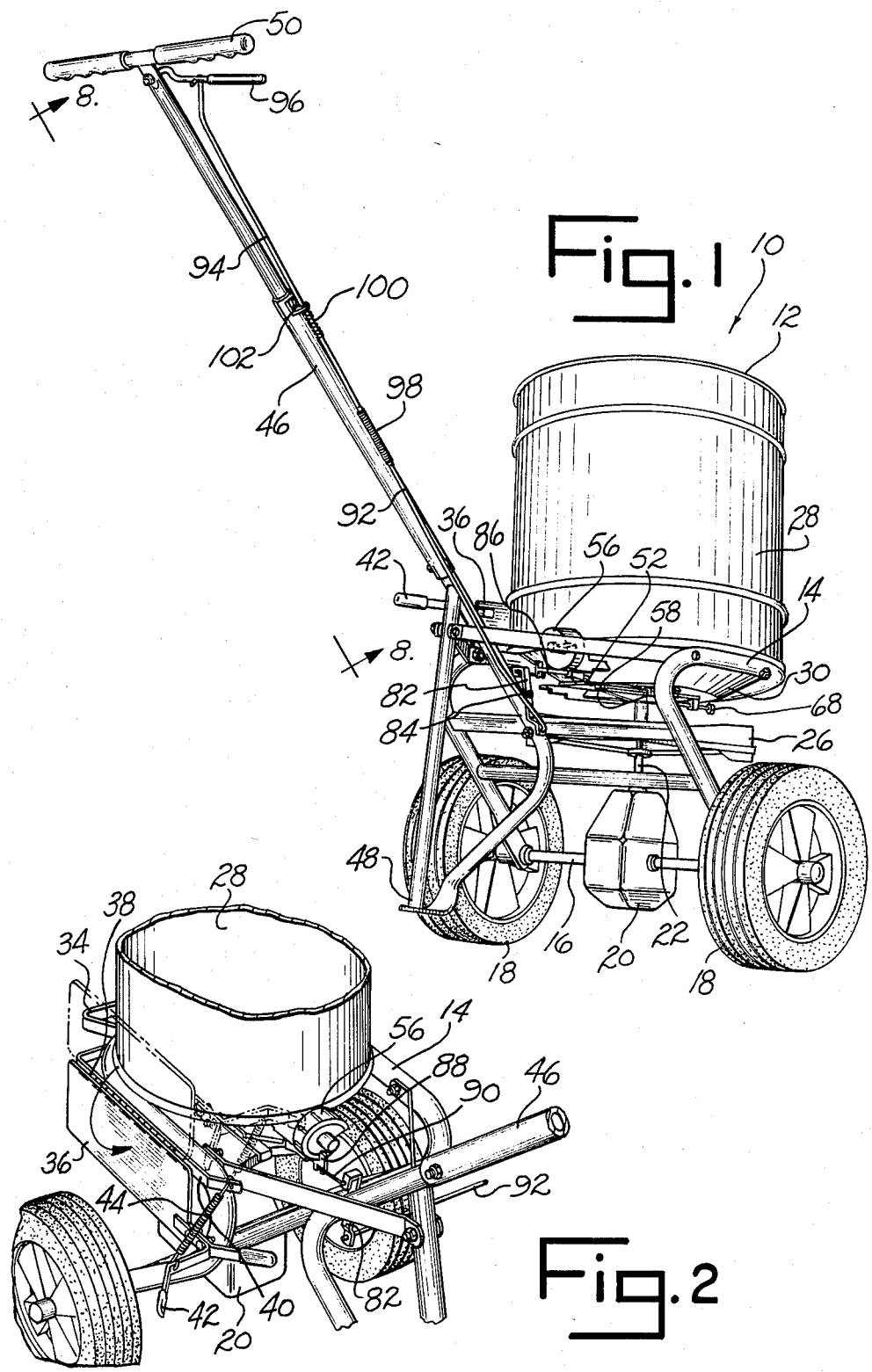

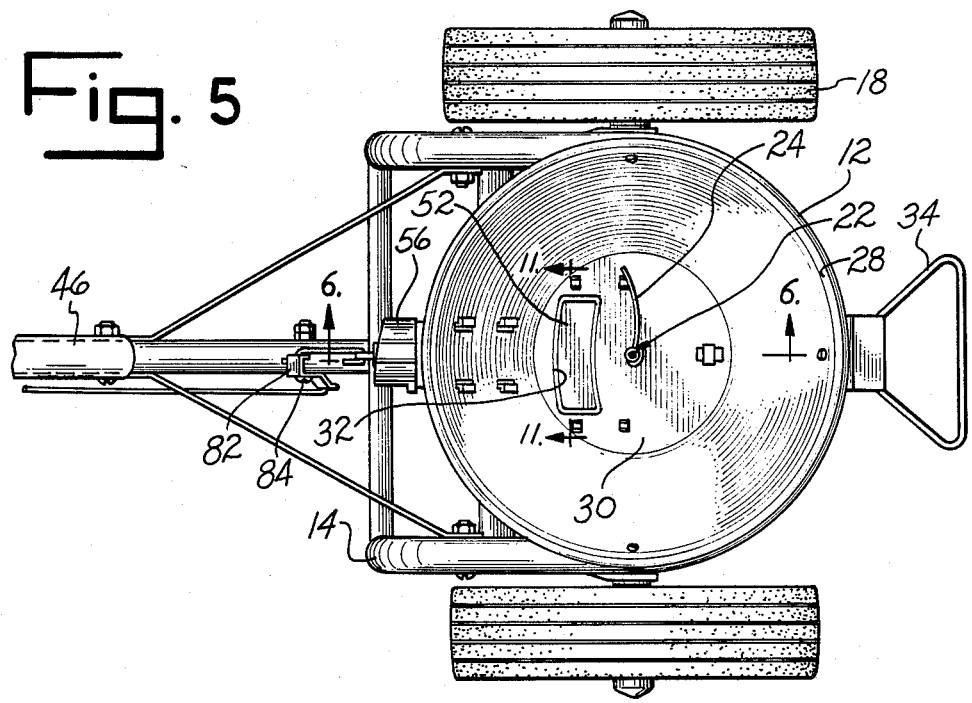
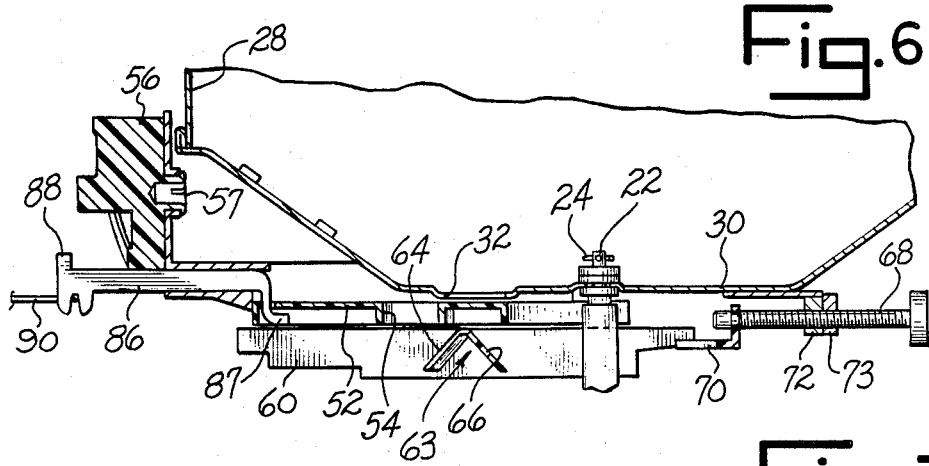
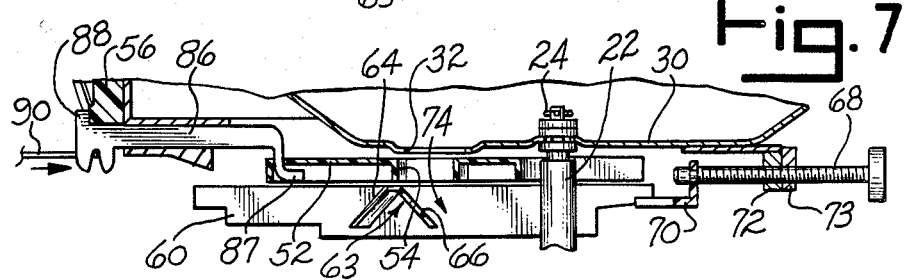

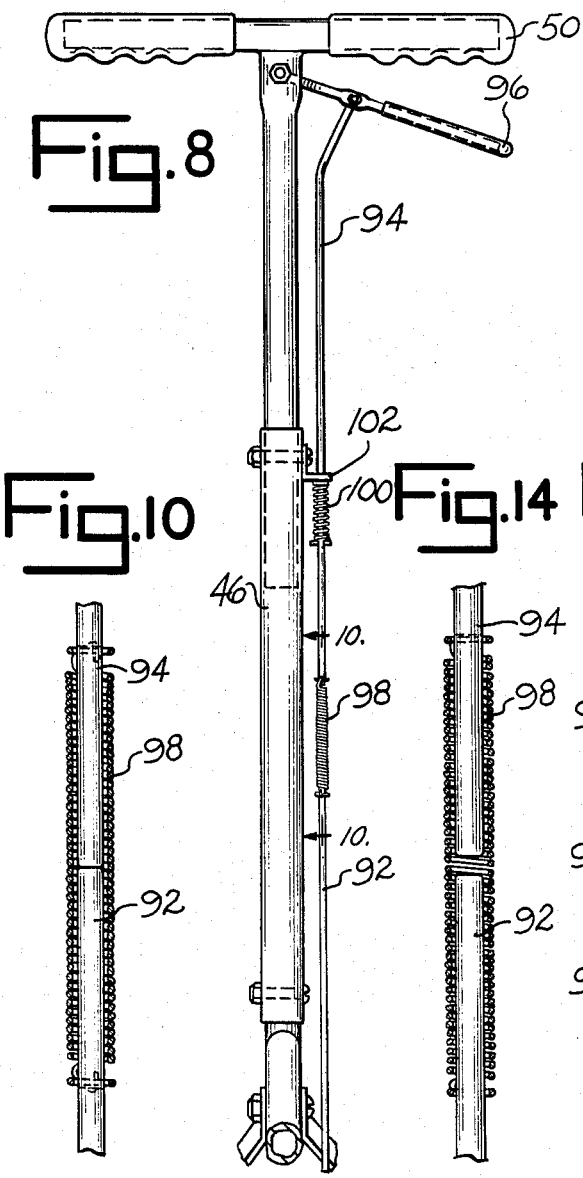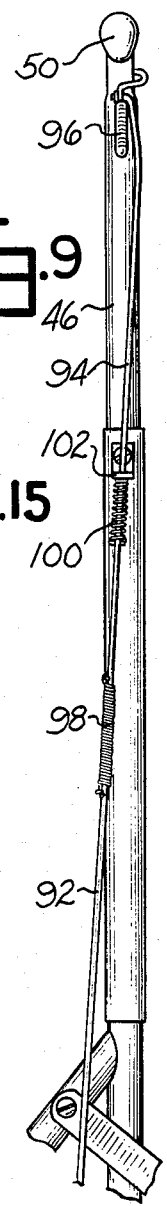

BROADCAST SPREADER FOR PULVERIZED MATERIALS

BACKGROUND OF THE INVENTION

This invention relates to broadcast spreaders.

Broadcast, or rotary-type spreaders are useful tools for spreading seeds, fertilizers, pesticides, and other products. Large areas may thus be covered or spread in a short period of time.

Most broadcast spreaders include a flow control member which the operator must shift to stop or start the flow of material. This procedure may require removing one hand from the handle and may result in time lapse, extra physical effort and poor control of the spreader. Furthermore, the fixed location of the upper discharge opening relative to the broadcast rotor may not give equal distribution of some types of materials under some operating conditions.

Other problems with broadcast spreaders include unwanted placement of material when spreading adjacent to walks, drives, plantings, etc. Also, there are no means of spreading products at extremely light rates over wide areas.

SUMMARY OF THE INVENTION

The broadcast spreader of this invention includes features designed to improve broadcast spreading operations. Such features may be used singly or in combination with my spreader construction described in U.S. Pat. No. 4,487,370.

The flow control member is connected to an actuator having a dual shaft and linkage, with the shafts operatively connected by a biasing member such as a spring. This arrangement permits the operator to hold the lever in a fully squeezed position at any dial setting, exerting only a limited, constant pressure against the flow control mechanism. The arrangement permits the operator to keep both hands on the handle at all times and produces split second spread/no spread control of spreading.

The spreader may also include a diffuser between the flow control and broadcast rotor which is shiftable to direct the material towards either the central part of the rotor or the outer portion of the rotor to regulate the area in which material is to be spread.

The spreader may further include a side deflector plate. The plate is shiftable between operative and inoperative positions to prevent unwanted directions of discharge of products being broadcast.

Finally, the spreader may include a restrictor plate to effectively spread products over a wide area at extremely light rates.

Accordingly, it is an object of the invention to provide a broadcast spreader which accurately and evenly distributes materials of a variety of types of products under a variety of types of conditions in a selected area or range.

Another object of the invention is to provide a broadcast spreader with a means of opening and closing a rate gate without time lapse or without removing one hand from the actuator.

Another object of the invention is to provide a broadcast spreader with means for restricting the discharge of products on untargeted areas.

Still another object of this invention is to provide a means for spreading light rates of product with wide lateral coverage.

Another object of this invention is to provide an efficient and economical broadcast spreader.

Still another object of this invention is to provide means for spreading light rates of material with wide lateral coverage.

Other objects of this invention will become apparent upon a reading of the following description.

BRIEF DESCRIPTION OF THE DRAWINGS

A preferred embodiment of the invention has been depicted for illustrative purposes wherein:

FIG. 1 is a perspective view of the spreader of this invention.

FIG. 2 is a fragmentary perspective view of the spreader illustrating a limiting deflector.

FIG. 5 is a fragmentary top plan view of the spreader.

FIG. 6 is a fragmentary sectional view taken along line 6—6 of FIG. 5 and illustrating one adjustment of the spreader.

FIG. 7 is a fragmentary sectional view like FIG. 6 illustrating another adjustment of the spreader.

FIG. 8 is a rear elevation view of the spreader handle showing the actuator means for the flow control means.

FIG. 9 is a side elevation view of the actuator of FIG. 8.

FIG. 10 is a fragmentary sectional view of the actuator taken along line 10—10 of FIG. 8.

FIG. 11 is a fragmentary sectional view of the hopper taken along line 11—11 of FIG. 5 and showing the discharge opening.

FIG. 12 is a fragmentary top plan view of the hopper discharge opening showing an optional flow regulator plate attached.

FIG. 13 is a sectional view taken along line 13—13 of FIG. 12.

FIG. 14 is a sectional view similar to FIG. 10 with the actuator at a high flow rate setting.

FIG. 15 is a sectional view similar to FIG. 14 at a low flow rate setting.

DESCRIPTION OF THE PREFERRED EMBODIMENT

Figure 3:
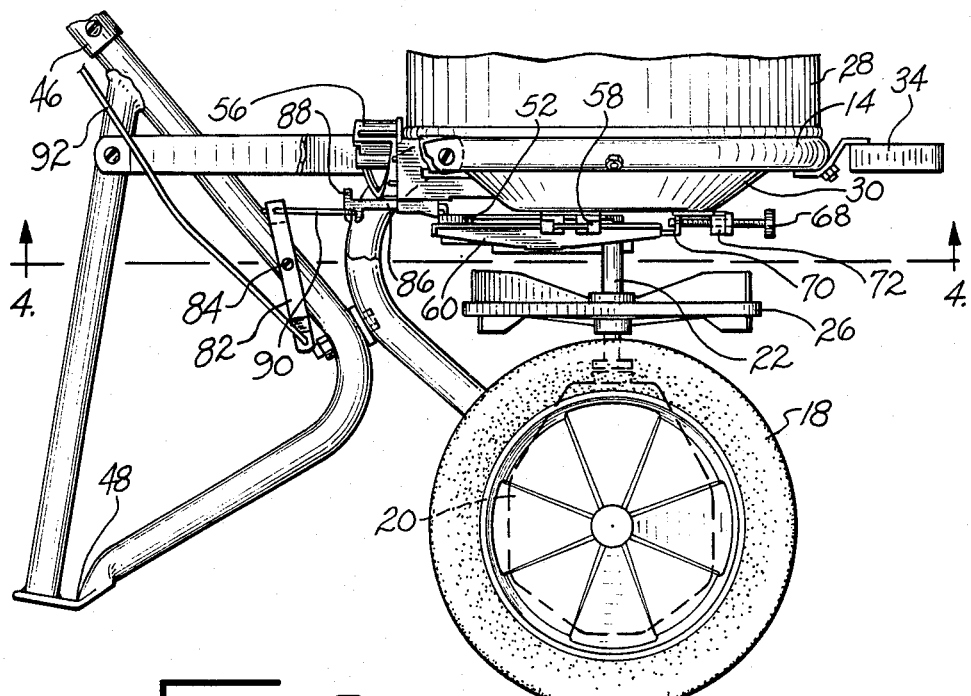
FIG. 3 is a fragmentary side elevation view of the spreader.
Figure 4:
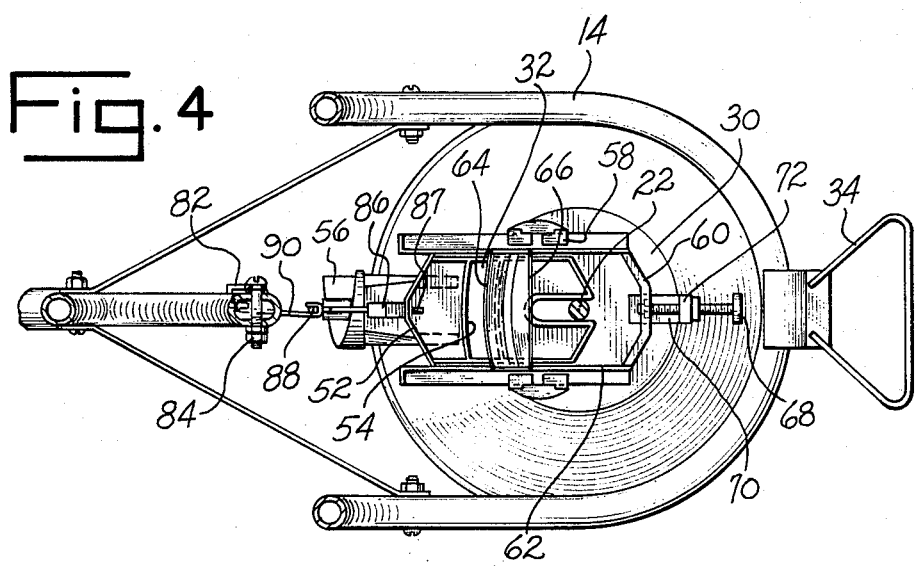
FIG. 4 is a cross-sectional view taken along line 4—4 of FIG. 3.

The preferred embodiment herein described is not intended to be exhaustive or to limit the invention to the precise form disclosed. Thus, the invention may be utilized in hand crank, tractor hitch, and power driven spreaders of different types. It is described to explain the principles of the invention and its application and practical use to enable others skilled in the art to utilize the invention.

Referring now to the drawings, reference numeral 10 refers generally to the broadcast spreader of this invention. Spreader 10 includes a storage hopper referred to generally by number 12 which holds a quantity of material to be spread. Spreader 10 is generally used to spread materials such as seeds, fertilizers, insecticides, herbicides, ice melting compounds, etc. Attached to hopper 12 is a support frame 14. Frame 14 may include a front bumper 34. An axle 16 is journalled in frame 14 spaced below hopper 12 and mounts a pair of wheels 18. A gearbox 20 which houses a plurality of bevel gears (not shown) drive connects axle 16 to a substantially vertical shaft 22 for rotation of shaft 22 upon rotation of axle 16 when wheels 18 turn. Shaft 22 may extend into hopper 12 and may carry a removable agitator pin 24 within the hopper. Alternatively, any suitable hand operated or power operated means may actuate shaft 22.

Hopper 12 includes a continuous side wall 28 and a bottom wall 30. Bottom 30 has a discharge opening 32 spaced from shaft 22. A distributor plate or rotor 26 is fixedly connected to shaft 22 below hopper opening 32. Distributor plate or rotor 26 is preferably of the type disclosed in my U.S. Pat. No. 4,487,370, issued Dec. 11, 1984, incorporated herein by reference. Thus far described, spreader 10 is of known construction.

A side deflector plate 36 may be attached to frame 14 by a hinge 38 connected to frame bracket 40. Deflector plate 36 includes an overcenter shifting lever 42 to allow the deflector plate to be manually shifted between operative and inoperative positions (See FIG. 2). Spring 44 biases movement of deflector plate 36 in either of its respective limit positions. Deflector plate 36 when it its operative lowered position, as shown by the solid lines in FIG. 2, prevents spreading of material from rotor 26 laterally to one side of the hopper, which prevents spreading of material onto adjacent sidewalks, driveways, plants, shrubs, etc.

Frame 14 may include a handle stem or extension 46 connected to the frame. Stem 46 includes a stand projection 48. A hand grip member 50 is carried by the terminal end of stem 46.

A flow control or plate 52, of the general type shown in U.S. Pat. No. 4,487,370, is disposed below hopper discharge opening 32 and is slidably connected to hopper bottom wall 30 by opposed channeled guides 58. Flow control plate 52 has an opening 54, preferably of the same shape and size as hopper discharge opening 32. A dial or cam 56 is adjustably attached to hopper 12 by mount 57 and is adjustable to shift flow control member 52 between flow restricting position (FIG. 6) and flow position (FIG. 7), and consequently, regulates the flow rate of material unto distributor plate or rotor 36. The manner of operation of valve plate 52 is described in my U.S. Pat. No. 4,487,370.

Slidable relative to hopper 12 just below flow control member 52 between opposed channels or guides 58 is a diffuser plate or member 60. Diffuser 60 has a pair of parallel side rails 62 spanned by a member or deflector 63 which preferably includes divergent walls 64, 66 as shown in FIGS. 6 and 7. Diffuser 60 is shiftable with respect to hopper opening 32 substantially parallel to the path of adjustment of flow control member 52 by adjustment screw 68 which is rotatably connected to plate flange 70 and is turned within threaded bracket 72. A jamb nut 73 may be threaded upon screw 68 and adjusted against bracket 72 to secure the screw 68 in selected position.

FIG. 7 illustrates one use of diffuser 60. With flow control opening 54 wholly or partially registering with hopper opening 32 and deflector part 66 positioned below the flow control opening 54, material falls through the openings 32 and 52 and contacts deflector part 66, whereby the material being discharged is deflected radially toward shaft 22 as shown by arrow 74 toward the center of rotor 26 for a desired material distribution pattern. Alternatively, deflector 60 may be adjusted by turning screw 68 so that deflector wall part 64 is located at the opposite side of hopper discharge opening 32 to direct the material onto the outer margin of rotor 26. This adjustability of diffuser 60 and positioning of deflector 63 permit selections of the spread pattern of the material to accommodate various types, sizes, weights and shapes of material to be spread, under varying conditions.

FIGS. 12 and 13 illustrate a flow restrictor plate 76. Restrictor plate 76 may be affixed, as by snap fitting through its tabs 78 (FIG. 13), to hopper bottom wall 30 over discharge opening 32. Restrictor plate 76 has an opening 80 which is smaller than the hopper discharge opening 32 to provide for spreading of material at extremely light flow rates and wide lateral coverage. The size of plate opening 80 is selected for the flow rate desired.

FIGS. 3, 8–10 and 14–15 illustrate the flow control actuator for adjusting the position of flow control member 52. As shown in FIG. 3, an arm 82 is pivotally connected to stand 48 at 84. Connected to flow control member 52 is a link 86 which includes an upward projecting finger 88 as described fully in U.S. Pat. No. 4,487,370. A rod, wire or cable 90 is connected between the upper end of arm 82 and link 86 as shown to permit correlative movement of the arm and link.

Connected to the lower end of arm 82 is a rigid control rod 92 which extends along stem 46. Another rigid control rod 94 is connected to a finger controlled or squeeze lever 96 which is pivotally connected to stem 46 just below handle 50. Rods 92 and 94 are substantially aligned and encircled at adjacent ends and operatively connected by a helical spring 98 having its ends attached to the rods, as shown in FIG. 10. The tension in spring 98 is sufficient to cause rod 92 to be shifted with rod 94 when lever 96 is shifted upwardly and yet allows the rods 92, 94 to axially separate when wire 90 is shifted and finger 88 contacts dial or cam 56 upon pivotal movement of arm 82 as flow control member 52 is shifted toward shaft 22. A spring 100 encircles and is connected at one end to rod 94 spaced above spring 98 and at its opposite end abuts a bracket 102 which is secured to stem 46. Spring 100 is compressed when lever 96 is pivoted and urges rods 92, 94 into abutment as seen in FIG. 10 to shift flow control plate 52 into its closed position (FIG. 6). When the operator releases lever 96 the spring 100 urges finger 88 against cam 56 (FIG. 7). In this manner the operator can open flow control member 52 with one hand while keeping both hands upon handle 50.

Material flow control is realized in the following manner. With the lever in the closed or standby position of FIG. 6 the operator first selects the desired flow rate by adjusting cam or dial 56 in the conventional manner. After the desired flow rate has been selected, the operator squeezes or pivots lever 96. Rods 92 and 94 are thus shifted to pivot arm 82 and shift the flow control member 52 into the cam selected open position (FIG. 7), whereby material is discharged from hopper 12 to rotor 26 for spreading. Rod 94 may shift away from rod 92 (FIGS. 14 and 15) but remains operatively connected to rod 92 by virtue of spring 98. This arrangement permits the operator to hold the lever 96 in an open position at any selected rate of material flow while finger 88 exerts a constant pressure on cam or dial 56. When flow is to be stopped, the operator releases lever 96 and spring 100 urges the rod 92, 94 into abutment and flow control member 52 shifts back into its normally closed position. As stated above spread pattern and/or lighter flow rates can be easily adjusted by adjusting flow control member 52, setting diffuser 60, and adjusting side deflector plate 36 as between full and dotted positions (FIG. 2).

It is to be understood that the above description does not limit the invention to the precise details, but may be modified within the scope of the following claims.

I claim:

1. In a spreader including a hopper means for storing a quantity of spreadable material, said hopper means having a lower discharge opening, means for controlling flow through said discharge opening, a rotatable broadcasting means positioned below said hopper discharge opening for catching and distributing spreadable material falling through said hopper discharge opening, and actuator means for shifting said flow control means between open and closed positions, said flow controlling means including an adjustable means adjacent said hopper and cooperating with said actuator means for setting said flow control means in a selected open position, the improvement wherein said actuator means includes a manually operable lever positioned spaced from said flow control means and spring urged to closed position, a rod connected to said lever, a second rod in general coaxial alignment to said first rod, an extendible member for allowing tensioned relative movement of said first rod relative to said second rod, and means connecting said second rod to said flow control means.

2. The spreader of claim 1 wherein said extendible member includes a helical spring connected between said first rod and second rod, said lever shiftable between flow position and a retracted position, said spring urging said second rod into engagement with said first rod and said flow control means into its flow position when the lever in selected operating position.

3. The spreader of claim 2, and said actuator means including a link connected to said flow control member, said link having a projection for contacting said adjustable means to regulate the position of the flow control member relative to said hopper discharge opening when the flow control means is in its selected open position.

4. The spreader of claim 1 and a deflector located at one side of said hopper outwardly spaced from said broadcasting means and being pivotably connected adjacent said hopper between an inoperative raised position and an operative lowered position, said deflector when in said operative lowered position constituting means for preventing spreading of said material in a preselected zone outwardly of said hopper and means for normally biasing said deflector into its operative and inoperative positions, said biasing means including a spring connected in an overcenter relationship relative to the pivotal connection of said deflector.

5. In a spreader, hopper means for storing a quantity of spreadable material and having a lower discharge opening, means for controlling flow of spreadable material through said discharge opening, a rotatable substantially horizontal broadcast member positioned below said hopper discharge opening, means for rotating said broadcast member about a central axis, said flow control means including a plate slidable below said hopper means and having an opening, means for shifting said flow control means between an open position with said plate opening communicating with the hopper discharge opening to allow flow of the material to said broadcast member and a closed position wherein flow of the spreadable material to the broadcast member is substantially cut off, the improvement comprising a diffuser shiftable between said flow control plate and above the broadcast member, means for shifting said diffuser relative to said hopper discharge opening along the direction of said control plate movement to position said diffuser at a selected location under the discharge opening, said diffuser constituting means for deflecting flow of said material to a preselected location upon said broadcast member said diffuser includes divergent side walls angled downwardly towards said broadcast member, said shifting means includes a screw rotatably connected to said diffuser and turned within a threaded bracket connected to the hopper.

6. In a spreader, hopper means for storing a quantity of spreadable material and having a lower discharge opening, a rotatable substantially horizontal broadcast member positioned below said hopper discharge opening, means for rotating said broadcast member about a central axis, the improvement comprising a diffuser shiftable beneath said discharge opening and above the broadcast member, means for shifting said diffuser relative to said hopper discharge opening to position said diffuser at a selected location under the discharge opening, said diffuser constituting means for deflecting flow of said material to a preselected location upon said broadcast member, said diffuser includes divergent side walls angled downwardly towards said broadcast member, said shifting means includes a screw rotatably connected to said diffuser and turned within a threaded bracket connected to said hopper.

7. The spreader of claim 6 wherein said screw constitutes means for finely adjusting the position of said diffuser relative to said hopper opening.

* * * * *